(12) United States Patent  
Sasaki (10) Patent No.: US 7,679,848 B2  
(45) Date of Patent: Mar. 16, 2010

(54) ACTUATOR AND LENS DRIVE APPARATUS

(75) Inventor: Ryota Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/501,797

(22) Filed: Aug. 10, 2006

(65) Prior Publication Data

US 2007/0188894 A1 Aug. 16, 2007

(30) Foreign Application Priority Data

Aug. 12, 2005 (JP) .............................. P2005-234641

(51) Int. Cl.  
*G02B 7/02* (2006.01)  
*G02B 15/14* (2006.01)

(52) U.S. Cl. ........................ 359/824; 359/696

(58) Field of Classification Search ................. 359/823, 359/824, 696, 811–826  
See application file for complete search history.

(56) References Cited

U.S. PATENT DOCUMENTS

| | | | |
|---|---|---|---|
| 5,812,330 A * | 9/1998 | Akada | 359/823 |
| 6,147,434 A | 11/2000 | Nakano et al. | |
| 6,188,530 B1 * | 2/2001 | Katsuragi | 359/824 |
| 6,194,811 B1 | 2/2001 | Shinke et al. | |
| 6,232,697 B1 * | 5/2001 | Mizumoto | 310/317 |
| 6,392,827 B1 | 5/2002 | Ueyama et al. | |
| 6,804,068 B2 * | 10/2004 | Sasaki et al. | 359/811 |
| 2002/0001467 A1 * | 1/2002 | Tanaka et al. | 396/177 |

FOREIGN PATENT DOCUMENTS

| | | |
|---|---|---|
| EP | 0823738 A2 | 2/1998 |
| EP | 0 836 266 A2 | 4/1998 |
| EP | 1 560 055 A1 | 8/2005 |
| JP | 2633066 B2 | 4/1997 |

\* cited by examiner

*Primary Examiner*—Ricky L Mack  
*Assistant Examiner*—Vipin M Patel  
(74) *Attorney, Agent, or Firm*—Birch, Stewart, Kolasch & Birch, LLP (57) ABSTRACT

An actuator is provided and has an electro-mechanical conversion element; a driving frictional member attached at one end of the electro-mechanical conversion element with respect to a direction of expansion and contraction thereof; a plurality of driven members frictionally engaged with the driving frictional member; a plurality of biasing units, each biasing one of the plurality of driven members to be frictionally engaged with the driving frictional member; and a biasing-force adjusting unit that adjusts respective biasing-forces of the plurality of biasing units.

19 Claims, 6 Drawing Sheets

ACTUATOR AND LENS DRIVE APPARATUS

FIELD OF THE INVENTION

The present invention relates to actuators, and more particularly to an actuator that is to be mounted on a small-sized precision apparatus, such as a digital camera or a cellular phone, and for driving a zoom lens.

BACKGROUND OF THE INVENTION

There is an actuator using a piezoelectric element as a driver for a lens unit of a digital camera or the like. For example, the actuator in Japanese Patent No. 2,633,066 has a piezoelectric element whose one end is secured to a drive shaft while the other end is fixed to an apparatus body. On the drive shaft, a lens barrel is slidably supported. The lens barrel is frictionally engaged with the drive shaft through utilization of a biasing force of a leaf spring. A drive pulse nearly in a saw-tooth form is applied to the piezoelectric element, to cause a deformation in the piezoelectric element at a rate different between an expansion and contraction directions thereof. For example, in case the piezoelectric element deforms moderately, the lens barrel moves together with the drive shaft. Conversely, when the piezoelectric element deforms fast, the lens barrel stays in the same position due to the inertia of the mass thereof. Consequently, by repetitively applying to the piezoelectric element a drive pulse nearly in a saw-tooth waveform, the lens barrel can be moved intermittently at a fine pitch.

However, the actuator in Japanese Patent No. 2,633,066 requires one drive member and a one driven member for one movable lens. For the lens apparatus having a plurality of movable lenses, the actuators increase in the number proportionally to the number of movable lenses. For this reason, size increase is encountered on a lens apparatus having a plurality of movable lenses.

SUMMARY OF THE INVENTION

An object of an illustrative, non-limiting embodiment of the invention is to provide a small-sized actuator by which a plurality of movable lenses can be separately controlled.

(1) An actuator according to one aspect of the invention includes: an electro-mechanical conversion element; a driving frictional member attached at one end of the electromechanical conversion element with respect to a direction of expansion and contraction thereof; a plurality of driven members frictionally engaged with the driving frictional member; a plurality of biasing units, each biasing one of the plurality of driven members to be frictionally engaged with the driving frictional member; and a biasing-force adjusting unit that adjusts respective biasing-forces of the plurality of biasing units.

In the actuator of the above (1), because the plurality of driven members are to be separately biased wherein the biasing forces are to be adjusted separately, each of the driven members can be moved properly by a distance at a moving rate and with thrust. Accordingly, the actuator of the above (1) is allowed to drive the plurality of driven members by means of the common driving frictional member and electro-mechanical conversion element. This can reduce the number of driving frictional members and electro-mechanical conversion elements, and hence achieve the size and cost reductions for the apparatus.

(2) The actuator according to the above (1) further includes: a position detecting unit that detects respective positions of the plurality of driven members; and a controller that controls the biasing-force adjusting unit based on a detection value by the position detecting unit.

According to the actuator of the above (2), because the biasing force is adjusted in accordance with the positions of the driven members, the driven members can be properly driven suitably for the positions thereof.

(3) The actuator according to the above (1) or (2), wherein the driving frictional member is formed in a rod form that is long in the direction of expansion and contraction of the electromechanical conversion element.

(4) The actuator according to any one of the above (1) to (3), wherein the biasing-force adjusting unit comprises a leaf spring of a shape-memory alloy, and the biasing-force adjusting unit comprises a heater for heating up the leaf spring by energization.

(5) The actuator according to any one of the above (1) to (4), wherein at least one of the plurality of driven members is attached with a support frame of a zoom lens.

In an actuator according to one aspect of the invention, because the plurality of driven members are to be separately biased wherein the biasing forces are to be adjusted separately, the plurality of driven members can be driven by the common driving frictional member and electro-mechanical conversion element. This can reduce the number of driving frictional members and electro-mechanical conversion elements, and hence achieve the size and cost reductions for the apparatus.

DETAILED DESCRIPTION OF THE INVENTION

With reference to the accompanying drawings, description is now made in detail on an exemplary embodiment of an actuator according to an aspect of the present invention.

Figure 1:
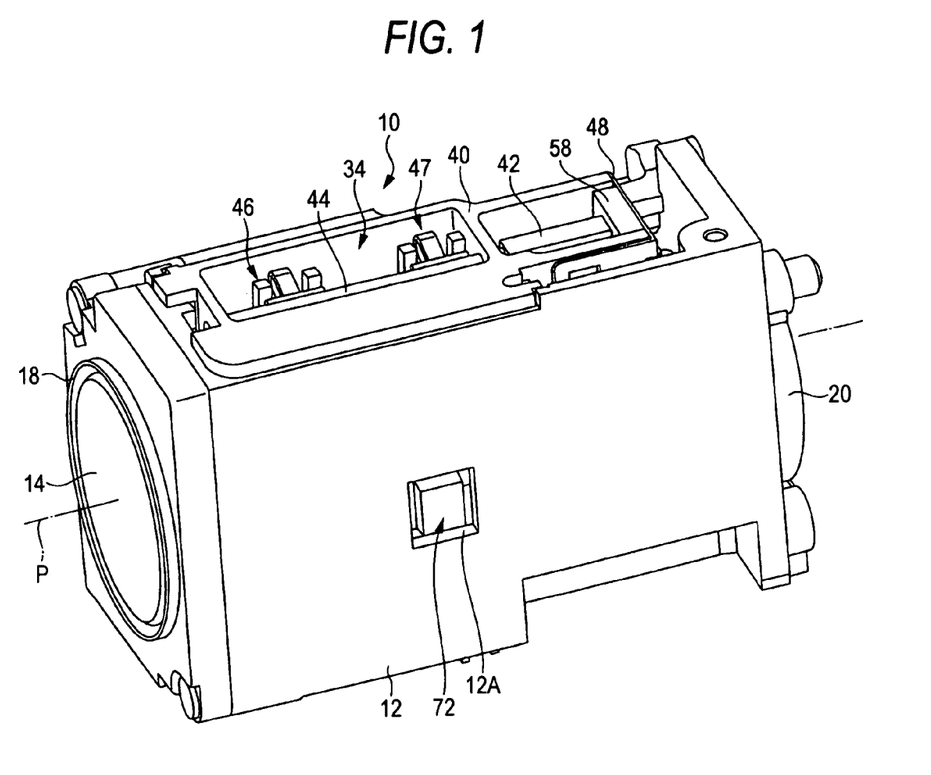
FIG. 1 is a perspective view showing a lens apparatus to which applied is an actuator according to an exemplary embodiment of the present invention.
Figure 2:
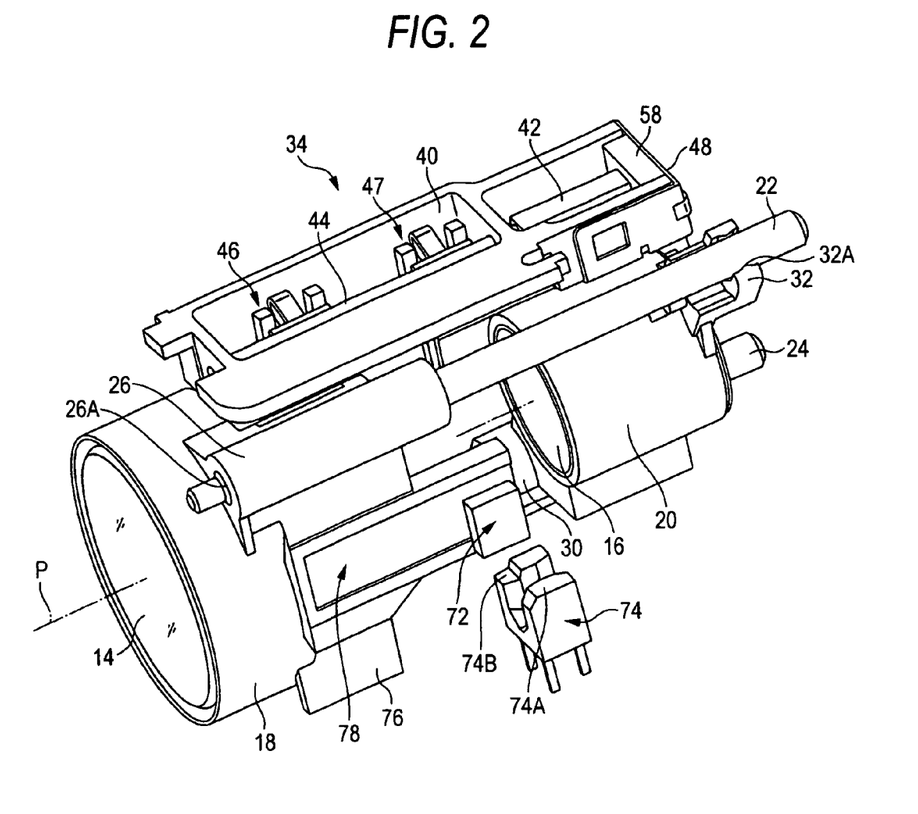
FIG. 2 is a perspective view showing an interior construction of the lens apparatus in FIG. 1.

FIG. 1 is a perspective view showing a lens apparatus (a lens drive apparatus) 10 to which is applied an actuator according to an aspect of the invention. FIG. 2 is a perspective view showing an internal arrangement of the same.

As shown in FIG. 1, the lens apparatus 10 has a body 12 formed nearly rectangular in form. The body 12 has therein zoom lenses (groups) 14, 16 that are shown in FIG. 2. Of the zoom lenses (groups) 14, 16, one is provided as a variable power lens while the other is as a correction lens. The zoom lenses (groups) 14, 16 are respectively held in support frames 18, 20. The support frames 18, 20 are supported slidable in the direction of an optical axis P by two guide rods 22, 24. The two guide rods 22, 24 are arranged diagonal in the body 12 and parallel with the optical axis P, thus being fixed on the body 12.

The support frame 18 has a guide 26 having a insert bore 26A in which the guide rod 22 is inserted and an engaging portion having a U-groove with which the guide rod 24 is engaged. Due to this, the guide frame 18 is to be guided over the two guide rods 22, 24 so that the zoom lens (group) 14 can be held movable in the direction of the optical-axis P. Likewise, the support frame 20 for the zoom lens 16 has a guide 30 having an insert bore (not shown) in which the guide rod 24 is inserted and an engaging portion 32 having a U-groove 32A with which the guide rod 22 is engaged. Due to this, the guide frame 20 is to be guided over the two guide rods 22, 24 so that the zoom lens (group) 16 can be held movable in the optical-axis P direction.

Figure 3:
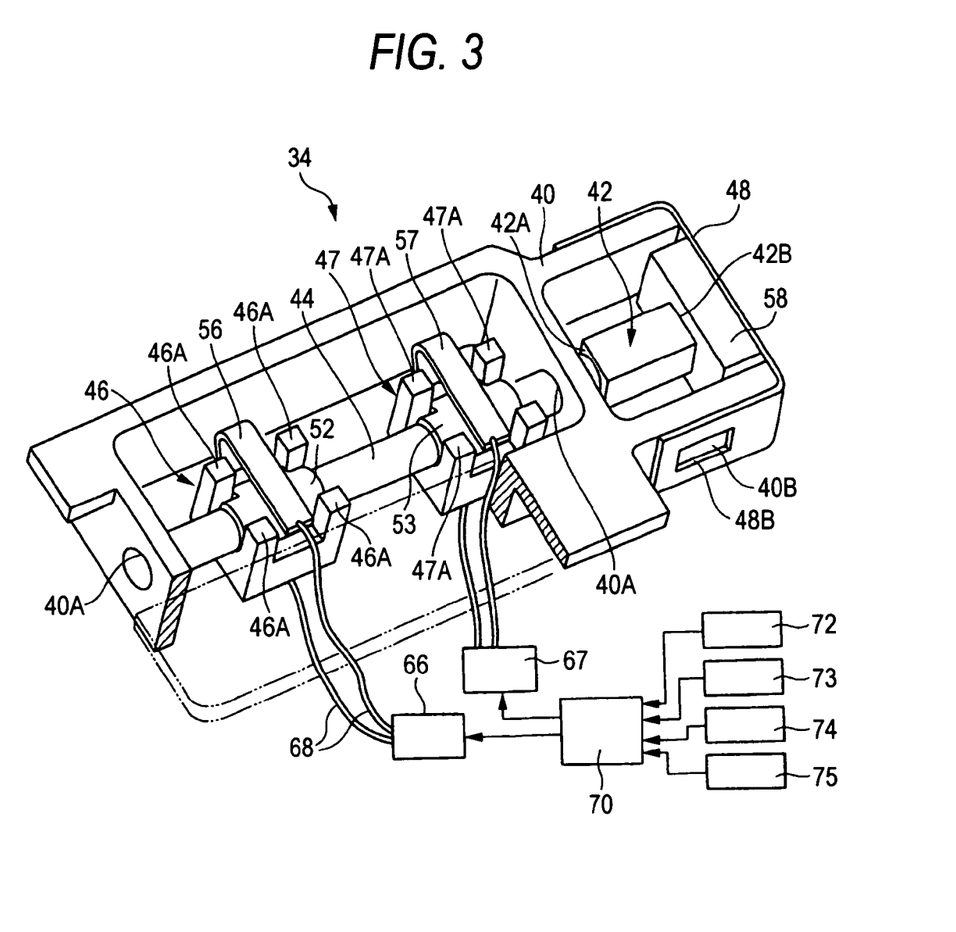
FIG. 3 is a perspective view showing a construction of an actuator.

The zoom lenses (groups) 14, 16 are to be driven in the direction of the optical-axis P by an actuator 34. FIG. 3 is a perspective view showing a structure of the actuator 34. As shown in FIG. 3, the actuator 34 mainly includes a fixed frame 40, a piezoelectric element (corresponding to an electro-mechanical conversion element) 42, a drive shaft (corresponding to a driving frictional member) 44, coupling pieces (corresponding to driven members) 46, 47, and a fixture 48. The fixed frame 40 is fixed on the body 12 of the FIG. 1 lens apparatus 10.

The piezoelectric element 42 includes layers stacked in the direction the optical-axis P (hereinafter referred to as a drive direction), thus being structured to deform (expand and contract) in the drive direction due to the application of voltage. Accordingly, by applying a voltage to the piezoelectric element 42, its lengthwise end faces 42A, 42B make a displacement in the drive direction.

Of the end faces 42A, 42B of the piezoelectric element 42, one end face 42A is secured to a base of the drive shaft 44 while the other end face 42B is fixed, by bonding, to a weight member 58 formed of non-rigid material.

The weight member 58 is to impart a load to the end face 42B, thereby preventing the displacement of the end face 42B greater than that of the end face 42A. Accordingly, the weight member 58 is preferably greater in weight than the drive shaft 44. The weight member 58 includes a material smaller in Young's modulus than the piezoelectric element 42 and drive shaft 44, e.g. being structured of a material having 300 MPa or smaller. For example, the weight member 58 is formed of a urethane rubber, a urethane resin or the like, and made by mixing such a rubber or resin with a metal powder, such as of tungsten, in order to raise the specific gravity. The specific gravity of the weight member 58 is preferably as high as possible for the sake of size reduction, e.g. set at 8 to 12 or the around.

The weight member 58 is bonded to the fastening plate 48, at a side opposite to the piezoelectric element 42. The fastening plate 48 is formed by bending a metal sheet into a squared-U form, thus being formed with apertures 48B in its bent regions at both ends. The fastening plate 48 is attached to the fixed frame 40 by being fitted at the apertures 48B over the projections 40B of the fixed frame 40. Due to this, the piezoelectric element 42 is held in the fixed frame 40 through the weight member 58 and fastening plate 48.

The piezoelectric element 42 is held displaceable at its end face 42B in the drive direction. Namely, the end face 42B of the piezoelectric element 42 is allowed to displace through an expansion and contraction of the non-rigid weight member 58 or a deflection of the fastening plate 48.

Meanwhile, the drive shaft 44, secured to the end face 42A of the piezoelectric element 42, is formed in a rod form and arranged to have an axis thereof aligned in the drive direction. The drive shaft 44 is inserted in and guided by two bores 40A, 40A formed in the fixed frame 40, thus being supported slidable in the axial direction. The drive shaft 44 uses, as a material, graphite crystal complex that graphite crystal is firmly combined together, e.g. carbon graphite.

The drive shaft 44 is engaged with the coupling pieces 46, 47. The coupling piece 46 is connected to the support frame 18 of the zoom lens 14 so that it can slide together with the support frame 18 in the direction of the optical-axis P (in the drive direction). Meanwhile, the coupling piece 47 is connected to the support frame 20 of the zoom lens 16 so that it can slide together with the support frame 20 in the direction of the optical-axis P (in the drive direction). The coupling pieces 46, 47 are each formed rectangular in form to have projections 46A, 46A . . . or 47A, 47A . . . protruding upward at four corners thereof.

Figure 4:
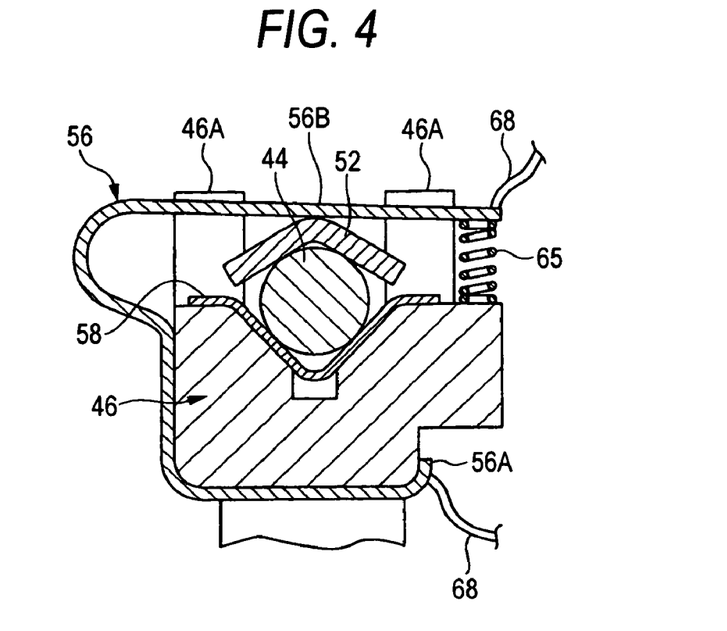
FIG. 4 is a sectional view showing a connection between the drive shaft and the coupling piece.
Figure 5:
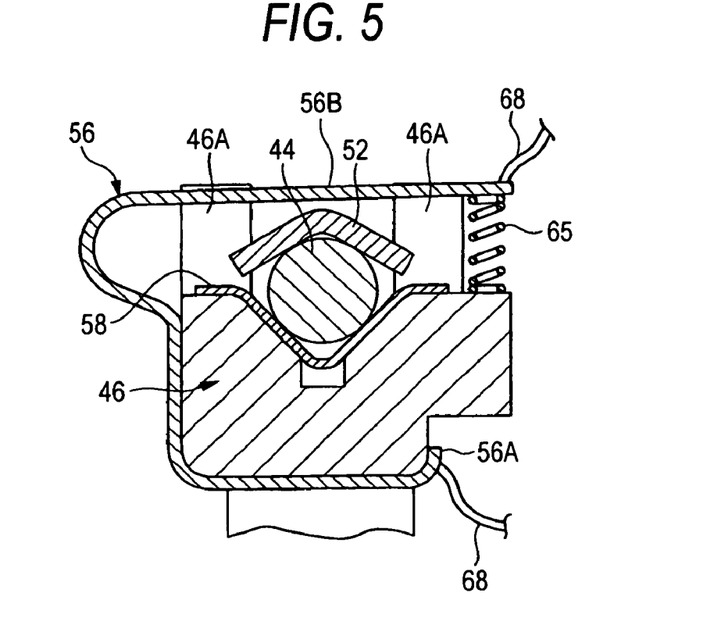
FIG. 5 is a sectional view showing a connection between the drive shaft and the coupling piece.

FIGS. 4 and 5 are sectional views of a connection between the coupling piece 46 and the drive shaft 44. As shown in the figures, first and second slide members 52, 58 are provided at the connection between the coupling piece 46 and the drive shaft 44. The first slide member 52 is arranged above the drive shaft 44 while the second slide member 58 is below the drive shaft 44. The first and second slide members 52, 58 are provided to stably obtain a frictional force between the coupling piece 46 and the drive shaft 44, and formed of stainless steel, for example.

The second slide member 58 is formed in a V-form and fixed on the coupling piece 46. Meanwhile, the first slide member 52 is formed in an inverted-V form and arranged in a region surrounded by the four projections 46a, 46A . . . , of the coupling piece 46. The first slide member 52 has cutouts at respective corners matched to the projections 46a, 46A . . . , of the coupling piece 46. This prevents the first slide member 52 from falling out of the coupling piece 46 when arranging the first slide member 52 in a region surrounded by the projections 46A, 46A . . . .

The coupling piece 46 is attached with a pressure spring 56. The pressure spring 56 is made by bending a metal sheet and attached on the coupling piece 46 by engaging its claw 56A with the lower region of the coupling piece 46. Meanwhile, the pressure spring 56 has a pressing portion 56B arranged above the first slide member 52 so that the pressing portion 56B pushes the first slide member 52 down. This places the drive shaft 44 in a state clamped by the first and second slide members 52, 58. Thus, the coupling piece 46 is frictionally engaged with the drive shaft 44 through the first and second slide members 52, 58. Incidentally, the frictional force between the coupling piece 46 and the drive shaft 44 is provided greater than a drive force caused upon applying a drive pulse with a moderate voltage change to the piezoelectric element 42 but smaller than a drive force caused upon applying a drive pulse with an abrupt voltage change to the piezoelectric element 42.

The pressure spring 56 is electrically connected with a heater 66. Namely, the pressure spring 56 has both ends respectively connected with leads 68, 68 and the leads 68, 68 are in turn connected to the heater 66. The heater 66 is configured to heat up the pressure spring 56 by applying a voltage to and energize the pressure spring 56. The pressure spring 56 is formed of a shape-memory alloy as mentioned before, to deform into a memorized shape when heated up to a temperature or higher. Specifically, by heating up the pressure spring 56, its pressing portion 56B moves down as shown in FIG. 4 to thereby cause a frictional force (slide resistance) acting between the first slide member 52 and the drive shaft 44 and between the second slide member 54 and the drive shaft 44. The slide resistance is preferably from 10 to 30 gf, more preferably from 15 to 25 gf.

A bias spring 65 is arranged at the tip of the pressure spring 56. The bias spring 65 is attached on the coupling piece 46 in a manner biasing the tip of the bias spring 65 upward. Accordingly, when ceasing the energization to the pressure spring 56, the pressure spring 56 is cooled down in temperature by a heat dissipation as shown in FIG. 5. Simultaneously, the pressure spring 56 at its tip retracts up due to the biasing-force of the bias spring 56. This releases the frictional engagement between the first slide member 52 and the drive shaft 44 and between the second slide member 54 and the drive shaft 44.

Meanwhile, the coupling between the coupling piece 47 and the drive shaft 44, shown in FIG. 3, is structured similarly to the coupling between the coupling piece 46 and the drive shaft 44. Namely, there are provided a first slide member 53 and a second slide member (not shown). Through the first slide member 53 and second slide member, frictional engagement is made between the drive shaft 44 and the coupling piece 47 through the first slide member 53 and second slide member. Meanwhile, the coupling piece 47 is attached with a pressure spring 57 formed of a shape-memory alloy. The pressure spring 57 presses the first slide member 52 downward. The pressure spring 57 is electrically connected with a heater 67. The heater 67 is configured to heat up the pressure spring 57 by energizing the pressure spring 57. The pressure spring 57 is formed such that, when heated up to a temperature or higher, its tip moves downward so that a frictional force can act between the first slide member 53 and the drive shaft 44 and between the second slide member and the drive shaft 44. A bias spring (not shown) is attached at the tip of the pressure spring 57, thus biasing the tip of the pressure spring 57 upward. Consequently, when ceasing the energization to the pressure spring 57, the pressure spring 57 is dissipated of heat and cooled down to the temperature or lower. The pressure spring 57 at its tip is retracted up by the biasing-force of the bias spring. This releases the frictional engagement between the first slide member 53 and the drive shaft 44 and between the second slide member and the drive shaft 44.

Incidentally, the memorized shape of the pressure spring 56, 57 is not limited to the above example. For example, it may be given in a manner pressing down the first slide member 52, 53 by memorizing a shape which the tip is retracted up and urging the tip of the pressure spring 56, 57 due to the bias spring. In such a case, when the heater 66 heats up the pressure springs 56, 57, the pressure springs 56, 57 at their tips retract up thus releasing the frictional engagement between the drive shaft 44 and the first slide member 52 or 53 and between the drive shaft 44 and the second slide members 58.

The heaters 66, 67 in FIG. 3 are connected to a controller 70 so that the temperature of the pressure spring 56, 57 can be controlled by the controller 70. The controller 70 is connected to position detectors 72, 73, 74, 75. The position detectors 72, 74 are sensors that detect the position of the support frame 18. Depending upon the detection value, the temperature of the pressure spring 56 is controlled. Meanwhile, the position detectors 73, 75 are sensors that detect the position of the support frame 20. Depending upon the detection value, the temperature of the pressure spring 57 is controlled. The following explanation is on the position detectors 72, 74, which is true for the position detectors 73, 74.

The position detector 72 shown in FIG. 2 is of a reflective photo-interrupter, which is fixedly received in the aperture 12A of the body 12. The position detector 72 is arranged opposite to a reflector unit 78 in a plate form integrally formed with the support frame 18. The position detector 72 is structured having a light emitter and light receiver, not shown, so that light can be emitted from the light emitter toward the reflector unit 78 and the light reflected upon the reflector unit 78 can be received at the light receiver thereby detecting the amount of light thereof.

Figure 7:
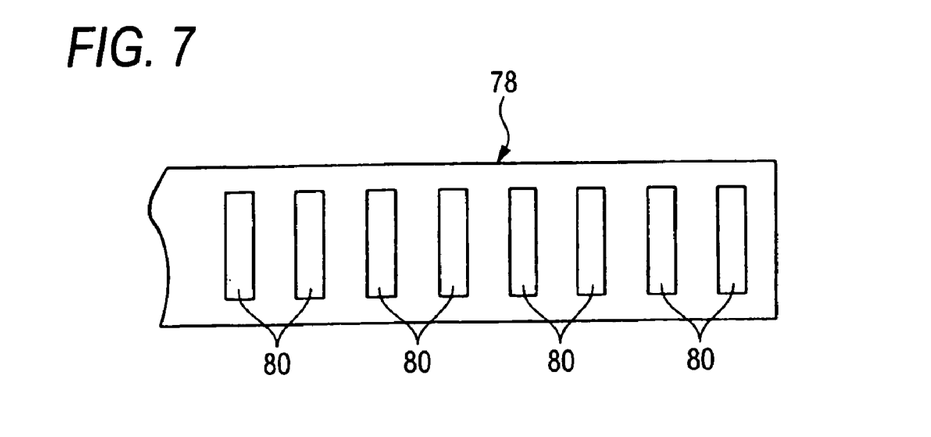
FIG. 7 is a front view showing a structure of a reflector unit.
Figure 8:
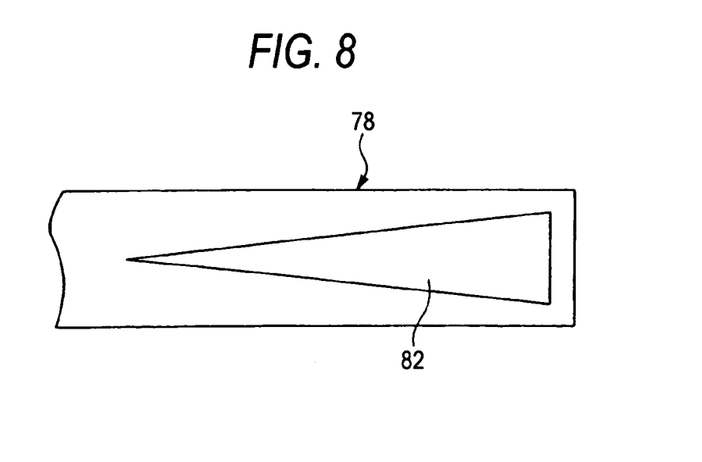
FIG. 8 is a front view showing a structure of a reflector unit different from FIG. 7.

As shown in FIG. 7, the reflector unit 78 is arranged with a plurality of reflectors 80, 80 . . . at a constant interval in the drive direction. Accordingly, when the actuator 34 is driven to move the reflector unit 78 in the direction of the optical-axis P, there occurs a change in the reception light amount at the light receiver of the position detector 72. This makes it possible to detect the movement amount of the reflector unit 78 (i.e. movement amount of the support frame 18). Incidentally, the reflector unit 78 is not limited in structure to the embodiment but may be structured to change the reflection amount when the reflector unit 78 is moved in the drive direction. Accordingly, a triangular reflector unit 82 may be provided as shown in FIG. 8.

Meanwhile, the position detector 74 is a transmissive photo-reflector, which is fixed on the body 12 (see FIG. 1). The position detector 74 is branched into two in the upper portion thereof, one of which is made as a light emitter 74A while the other is a light receiver 74B. The position detector 74 is structured to detect the amount of light reception, at the light receiver 74B, of the light emitted from the light emitter 74A to the light receiver 74B.

Between the light receiver 74A and the light emitter 74B, a plate-like light shielding portion 76 is to be removably inserted which is integrally formed with the support frame 18. Namely, when the support frame 18 is moved in the direction of the optical-axis P by driving the actuator 34, the light shielding portion 76 is inserted between the light emitter 74A and light receiver 74B of the photo-interrupter 74. This causes a change of the light reception amount at the light receiver 74B, thus detecting a fact that the light shielding portion 76 has been inserted between the light emitter 74A and the light receiver 74B. Therefore, it can be detected that the support frame 18 has moved to the reference position.

By detecting a reference position of the support frame 18 by means of the position detector 74 and a moving amount of the support frame 18 by means of the position detector 72 as stated above, the position of the support frame 18 can be determined correctly. Likewise, by detecting a reference position of the support frame 20 by means of the position detector 75 and a moving amount of the support frame 20 by means of the position detector 73, the position of the support frame 20 can be determined correctly.

The control unit 70 takes control of the heater 66 in accordance with the detection value by the position detector 72, 74 (i.e. the position of the support frame 18 and coupling piece 46), and of the heater 67 in accordance with the detection value by the position detector 73, 75 (i.e. the position of the support frame 20 and coupling piece 47). Accordingly, by placing the pressure spring 56 under heating-control in accordance with the position of the coupling piece 46, the coupling piece 46 can be frictionally engaged with and disengaged from the driving shaft 44. Likewise, by placing the pressure spring 57 under heating-control in accordance with the position of the coupling piece 47, the coupling piece 47 can be frictionally engaged with and disengaged from the driving shaft 44.

Figure 6A:
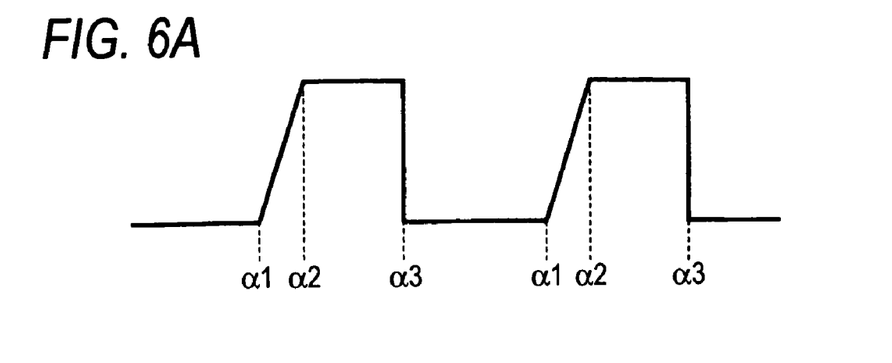
FIGS. 6A and 6B are figures showing examples of a voltage drive pulse to be applied to a piezoelectric element.
Figure 6B:
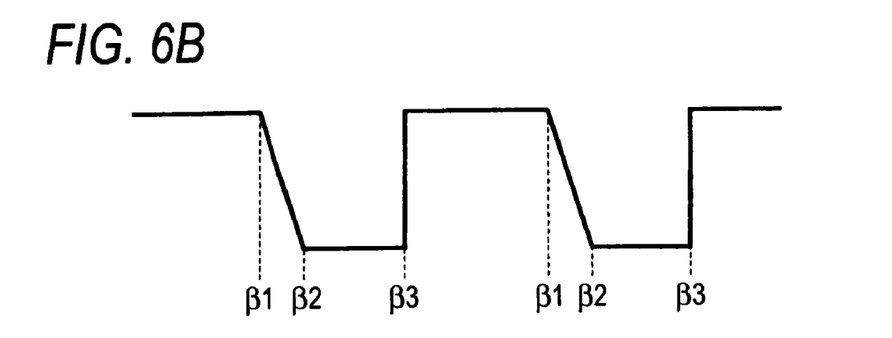

A drive pulse voltage, shown in FIGS. 6A and 6B, is applied to the piezoelectric element 42. FIG. 6A depicts a drive pulse for driving the FIG. 3 coupling piece 46, 47 toward the left while FIG. 6B depicts a drive pulse for driving the FIG. 3 coupling piece 46, 47 toward the right.

In the case of FIG. 6A, applied to the piezoelectric pulse 42 is a drive pulse nearly in a saw-tooth form that rises moderately at time from α1 to α2 and abruptly falls at time α3. Accordingly, the piezoelectric element 42 expands moderately in time of α1 to α2. In this duration, because the drive shaft 44 moves at a moderate rate, the coupling pieces 46, 47 move together with the drive shaft 44. This can move the coupling pieces 46, 47 in FIG. 3 toward the left. At time α3, the piezoelectric element 42 contracts abruptly, and accordingly the drive shaft 44 moves toward the right. In this duration, because of an abrupt movement of the drive shaft 44, only the drive shaft 44 moves while the coupling pieces 46, 47 stay in the position due to its inertia. Accordingly, by repetitively applying the saw-tooth drive pulse shown in FIG. 6A, the coupling pieces 46, 47 in FIG. 3 repeat the leftward movement and rest, thus being moved toward the left.

In the case of FIG. 6B, applied to the piezoelectric pulse 42 is a drive pulse nearly in a saw-tooth form that falls moderately at time from β1 to β2 and abruptly rises at time β3. Accordingly, the piezoelectric element 42 contracts moderately in time of β1 to β2. In this duration, because the drive shaft 44 displaces moderately, the coupling pieces 46, 47 move together with the drive shaft 44. This can move the coupling piece 46, 47 in FIG. 3 toward the right. At time β3, the piezoelectric element 42 expands abruptly, and accordingly the drive shaft 44 moves toward the left. In this duration, because of an abrupt movement of the drive shaft 44, only the drive shaft 44 moves while the coupling pieces 46, 47 stay in the position due to its inertia. Accordingly, by repetitively applying the saw-tooth drive pulse shown in FIG. 6B, the coupling piece 46, 47 in FIG. 3 repeat the rightward movement and rest, thus being moved toward the right.

An operation of the actuator 34 thus constructed is now explained.

The actuator 34 according to an aspect of the invention is allowed to drive the support frames 18, 20 simultaneously or to drive the support frames 18, 20 separately. For example, in the case of driving the support frames 18, 20 simultaneously, the pressure springs 56, 57 are heated up by the heaters 66, 67 thus being given with a biasing-force. This places the coupling pieces 46, 47 in engagement with the drive shaft 44 by a frictional force. Accordingly, when a pulse voltage is applied to the piezoelectric element 42, the coupling pieces 46, 47 can be moved simultaneously along the drive axis 44.

Meanwhile, when driving only the support frame 18, the pressure spring 56 is heated up and given a biasing-force by the heater 66. This places the coupling piece 46 in engagement with the drive shaft 44 by a frictional force. Accordingly, when a pulse voltage is applied to the piezoelectric element 42, the coupling piece 46 only can be moved along the drive axis 44. In such a case, the coupling piece 47 is cooled down and released of the frictional engagement from the drive shaft 44. Thus, the coupling piece 46 only can be moved without a movement of the coupling piece 47.

Likewise, in the case of driving only the support frame 20, the heater 67 heats up the pressure spring 57 and provides a biasing-force to it. This places the coupling piece 47 in engagement with the drive shaft by a frictional force. Accordingly, when a pulse voltage is applied to the piezoelectric element 42, the coupling piece 47 only can be moved along the drive axis 44. In such a case, the coupling piece 46 is cooled down and released of the frictional engagement from the drive shaft 44. Thus, the coupling piece 47 only can be moved without a movement of the coupling piece 46.

In this manner, according to the embodiment, both of or only one of the support frames 18, 20 can be driven, Therefore, the zoom lenses (groups) 14, 16 can be moved respectively to positions.

Meanwhile, the actuator 34 in this exemplary embodiment can move the two coupling pieces 46, 47 by means of one piezoelectric element 42 and drive shaft 44. This accordingly can reduce the number of piezoelectric element 42, and drive shaft 44 and hence the size of the actuator 34.

Figure 9:
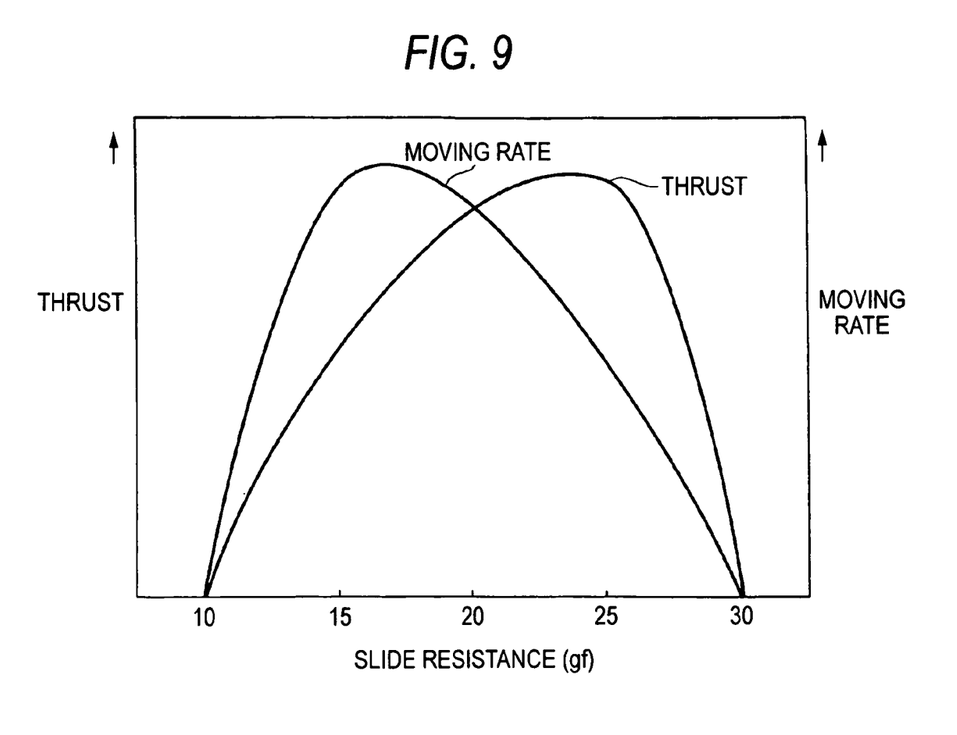
FIG. 9 is a figure showing a relationship of a slide resistance and thrust against a moving rate.

Incidentally, in this exemplary embodiment, the coupling piece 46 or 47 not to drive was released of its frictional engagement from the drive shaft 44. However, it is satisfactory that the frictional force (slide resistance) is provided out of a range (e.g. from 10 gf to 30 gf). FIG. 9 shows a relationship of a thrust and moving rate of the coupling piece 46, 47 against a slide resistance of the coupling piece 46, 47 over the drive shaft 44. As shown in FIG. 9, at a slide resistance of smaller than 10 gf, the coupling piece 46, 47 have a thrust and moving rate of zero wherein movement no longer takes place. Meanwhile, at a slide resistance of 30 gf and over, the coupling piece 46, 47 have a thrust and moving rate of zero wherein movement no longer occurs. Therefore, by setting the coupling piece 46, 47 not to move with a slide resistance of smaller than 10 gf or greater than 30 gf, the relevant coupling piece 46, 47 can be halted without any movement. Conversely, the coupling piece 46, 47 to move are preferably set with a slide resistance of from 10 gf to 30 gf, preferably from 15 gf to 25 gf. This can move the coupling piece 46, 47 at a proper moving rate and thrust.

Meanwhile, although this exemplary embodiment provides the two driven members (coupling pieces 46, 47), three or more driven members may be provided.

Incidentally, the material of the weight member 58 is not limited to the non-rigid material mentioned before but may use a rigid material. However, the use of a non-rigid material is preferred in respect of the following point. Namely, the use of a weight member 58 of a non-rigid material lowers the resonant frequency of a system formed by the piezoelectric element 42, the driving frictional member 44 and the weight member 58. The lowering in the resonant frequency reduces the effect due to the variation in the structure of the piezoelectric element 42, the driving frictional member 44 and the weight member 58, thus obtaining a stable drive force. Meanwhile, by lowering the resonant frequency $f_0$, drive frequency f can be easily set within an anti-vibrating region of $f \geq 2^{1/2} \cdot f_0$ wherein the effect of resonance is reduced to provide a stable drive force. This can positively convey, to the driven member, the drive force caused by an expansion and contraction of the piezoelectric element 42, thus correctly moving the driven member in the direction of expansion and contraction of the piezoelectric element 42. Furthermore, because the resonant frequency $f_0$ is decreased to reduce the effect of resonance, actuator-support position and method can be desirably selected. For example, the actuator can be held on the end face 42A or side surface of the piezoelectric element 42 or on the side surface or end face of the drive shaft 44.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. 2005-234641 filed Aug. 12 of 2005, the contents of which are incorporated herein by reference.

What is claimed is:

1. An actuator comprising:
   an electro-mechanical conversion element;
   a driving frictional member attached at one end of the electro-mechanical conversion element with respect to a direction of expansion and contraction thereof;
   a plurality of driven members frictionally engaged with the same driving frictional member;
   a plurality of biasing units, each biasing one of the plurality of driven members with a biasing force which is perpendicular to said same driving frictional member, to frictionally engage said driven members with said same driving frictional member;
   a biasing-force adjusting unit that adjusts said respective biasing-forces of the plurality of biasing units; and
   a controller that controls the biasing-force adjusting unit to vary a value of said biasing force applied to one of said driven members.

2. The actuator according to claim 1, further comprising:
   a position detecting unit that detects respective positions of the plurality of driven members; and wherein
   said controller controls the biasing-force adjusting unit based on a detection value by the position detecting unit.

3. The actuator according to claim 1, wherein the driving frictional member has a rod form that is long in the direction of expansion and contraction of the electro-mechanical conversion element.

4. The actuator according to claim 1, wherein one of said biasing units comprises a leaf spring of a shape-memory alloy, and the biasing-force adjusting unit comprises a heater for heating up the leaf spring by energization.

5. The actuator according to claim 1, wherein at least one of the plurality of driven members is attached with a support frame of a zoom lens.

6. A lens drive apparatus comprising an actuator according to claim 1.

7. The actuator according to claim 1, wherein the plurality of driven members are separately biased wherein the biasing forces are adjusted separately.

8. The actuator according to claim 1, wherein said electro-mechanical conversion element is a piezoelectric element.

9. The actuator according to claim 1, further comprising a weight member to impart a load to an end face of said electro-mechanical conversion element.

10. The actuator according to claim 9, wherein said weight member is greater in weight than said driving frictional member.

11. The actuator according to claim 9, wherein said electro-mechanical conversion element is a piezoelectric element, and said weight member is made of a non-rigid material, to lower a resonant frequency of a system formed by said the piezoelectric element, said driving frictional member and said weight member.

12. The actuator according to claim 1, wherein first and second slide members are provided to stably obtain a frictional force between one of said driven members and said driving frictional member, said first slide member being arranged above said driving frictional member, and said second slide member being arranged below said driving frictional member.

13. The actuator according to claim 1, wherein each of said biasing units comprises a leaf spring of a shape-memory alloy, and the biasing-force adjusting unit comprises heaters for heating up the leaf springs by energization.

14. The actuator according to claim 1, further comprising a bias spring, wherein said bias spring is arranged to bias a pressure spring included in one of said biasing units.

15. The actuator according to claim 1, wherein said actuator has a driving mode in which said driven members are moved simultaneously along said driving frictional member, and a driving mode in which one of said driven members is moved along said driving frictional member and another of said driven members is not moved along said driving frictional member.

16. An actuator comprising:
    an electro-mechanical conversion element;
    a driving frictional member attached at one end of the electro-mechanical conversion element with respect to a direction of expansion and contraction thereof;
    a plurality of driven members frictionally engaged with the same driving frictional member;
    a plurality of biasing units, each biasing one of the plurality of driven members to be frictionally engaged with said same driving frictional member; and
    a biasing-force adjusting unit that adjusts respective biasing-forces of the plurality of biasing units,
    wherein one of said biasing units are placed under heating-control in accordance with a position of one of said driven members, to frictionally engage and disengage said driven member from said driving frictional member.

17. An actuator comprising:
    an electro-mechanical conversion element;
    a driving frictional member attached at one end of the electro-mechanical conversion element with respect to a direction of expansion and contraction thereof;
    a plurality of driven members frictionally engaged with the same driving frictional member;
    a plurality of biasing units, each biasing one of the plurality of driven members to be frictionally engaged with said same driving frictional member;
    a biasing-force adjusting unit that adjusts respective biasing-forces of the plurality of biasing units; and
    a weight member to impart a load to an end face of said electro-mechanical conversion element,
    wherein said electro-mechanical conversion element is a piezoelectric element, and said weight member is made of a non-rigid material, to lower a resonant frequency of a system formed by said the piezoelectric element, said driving frictional member and said weight member, and
    wherein a resonant frequency $f_0$ is lowered and a drive frequency $f$ is set within an anti-vibrating region of $f \geq 2^{1/2} \cdot f_0$, to reduce an effect of resonance and provide a stable drive force.

18. An actuator comprising:
    an electro-mechanical conversion element;
    a driving frictional member attached at one end of the electro-mechanical conversion element with respect to a direction of expansion and contraction thereof;

a plurality of driven members frictionally engaged with the same driving frictional member;

a plurality of biasing units, each biasing one of the plurality of driven members with a biasing force which is perpendicular to said same driving frictional member, to frictionally engage said driven members with said same driving frictional member;

a weight member to impart a load to an end face of said electro-mechanical conversion element, said weight member being made of a rigid material;

a biasing-force adjusting unit that adjusts said respective biasing-forces of the plurality of biasing units; and a controller that controls the biasing-force adjusting unit to vary a value of said biasing force applied to one of said driven members.

19. The actuator according to claim 18, wherein a slide resistance of at least one of said driven members on said driving frictional member is set between 10 gf and 30 gf.

* * * * *